No. 719,609. PATENTED FEB. 3, 1903.
W. H. PRATT.
POWER FACTOR INDICATOR.
APPLICATION FILED JUNE 7, 1902.
NO MODEL. 2 SHEETS—SHEET 1.

Witnesses.
J. Ellis Glenn.
Helen Oxford

Inventor.
William H. Pratt
by Albert G. Davis
Atty.

No. 719,609. PATENTED FEB. 3, 1903.
W. H. PRATT.
POWER FACTOR INDICATOR.
APPLICATION FILED JUNE 7, 1902.
NO MODEL. 2 SHEETS—SHEET 2.

Witnesses.
J. Ellis Glenn.
Helen Oxford.

Inventor:
William H. Pratt.
by Albert G. Davis
Atty.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

POWER-FACTOR INDICATOR.

SPECIFICATION forming part of Letters Patent No. 719,609, dated February 3, 1903.

Application filed June 7, 1902. Serial No. 110,636. (No model.)

*To all whom it may concern:*

Be it known that I, WILLIAM H. PRATT, a citizen of the United States, residing at Lynn, county of Essex, State of Massachusetts, have invented certain new and useful Improvements in Power-Factor Indicators, (Case No. 2,526,) of which the following is a specification.

Among the aims of my present invention is the production of a power-factor indicator which shall indicate the power factor of an alternating-current circuit according to the definition that power factor is the ratio between the true watts and the apparent watts, or, in other words, is the ratio between the actual energy and the volt-amperes of the system, while a further object of my invention is to obtain an indicator the correctness of the indications of which will not be affected by or dependent upon the wave shape of the alternating current. To accomplish these results, I have produced a power-factor indicator which consists, broadly speaking, of two members, one of which indicates the ratio between the watts of the circuit and a quantity represented by the current squared. The other member produces indications representing the ratio between the watts and the square of the voltage. The indications of these two members are multiplied together and produce a resulting indication proportional to the ratio between the watts squared and the volt-amperes squared. In other words, the indication is proportional to the square of the power factor. The instrument is, however, calibrated to read power factor directly.

The novel features which I believe characterize my invention I have pointed out with particularity in the appended claims, while the invention itself I have endeavored to make clear in the following description, which is to be taken in connection with the accompanying drawings, representing one embodiment of my invention, in which—

Figure 1:
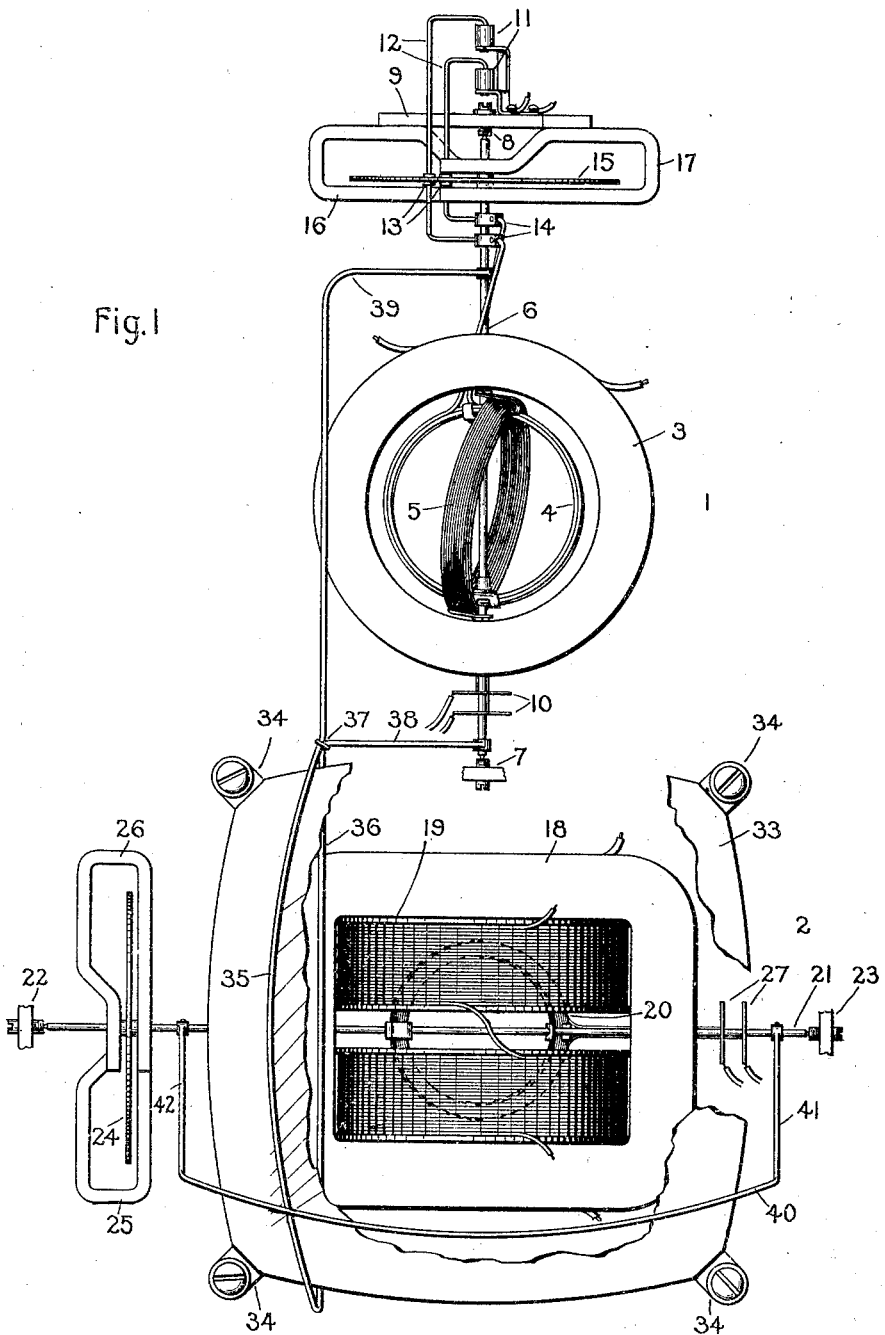
Figure 2:
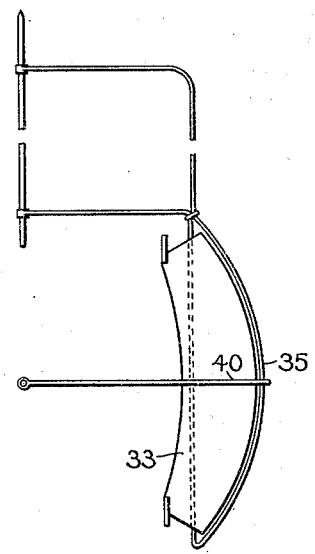
Figure 3:
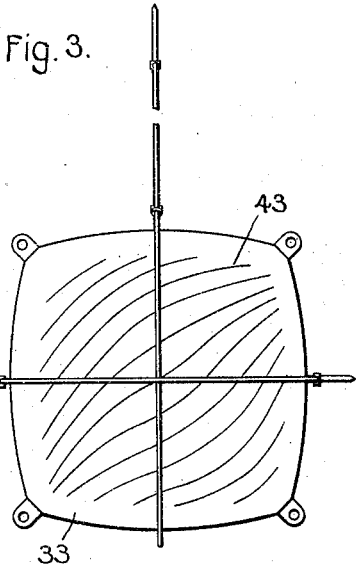

Figure 1 is a view of the operating parts of the instrument as a whole. Figs. 2 and 3 are detail views of portions of the instrument, and Fig. 4 is a diagram of circuits.

In Fig. 1 the two principal members of the instrument are indicated at 1 and 2. The member 1 consists of such a combination of current and potential coils as will produce a deflection proportional to the ratio between the watts and the current squared. Various arrangements may be used for this purpose, one of which is represented in the drawings as consisting of a fixed current-coil 3, in movable relation to which are mounted another current-coil 4 and a potential coil 5. The last two coils are arranged within the fixed coil 3 and are mounted at an angle to each other and carried by a pivoted shaft 6, the lower end of which is supported in a bearing 7, carried by the base of the instrument, (not shown,) and the upper end in a similar bearing 8, supported in a plate 9, also fixed to the base of the instrument. Current is conveyed to the potential coil 5 through reversely-arranged delicate spiral conductors 10 of a character well known in connection with measuring instruments. The movable current-coil 4, since it carries more current than could conveniently be conveyed to it through the medium of a light spring, such as 10, is connected in circuit by means of mercury-cups 11, supported on the plate 9 and insulated from each other. Into these mercury-cups dip conductors 12, which pass down through insulating-bushings 13 and are connected to the terminals of the coil 4 through the clips 14. The bushings 13 serve to insulate the conductors 12 from a Foucault disk 15 of aluminium carried by the shaft 6 and arranged in coöperative relation with permanent magnets 16 and 17, supported from the plate or bracket 9. This Foucault disk and its coöperating magnets serve to damp the vibrations of the pivoted member carrying the coils 4 and 5. The other member of the power-factor indicator consists of coils so related to each other as to produce indications representing the ratio between the watts and the square of the voltage. A number of arrangements may be made which will effect this purpose, one of which is indicated in the drawings and consists, as shown, of a fixed or stationary current-coil 18, another fixed coil 19 at right angles to the first and adapted to serve as a potential coil. With these two coils coöperates a movable coil 20 in series with the fixed coil 19 and mounted within the influence of the coils 18 and 19. The coil 20, which is a potential coil, is carried by a shaft 21, pivoted in bearings at 22 and 23, respectively. A damping-disk 24 and coöperating magnets 25 and 26 serve to damp the oscillations of the shaft 21 and the parts carried thereby. Current is conveyed to the coil 20 on this shaft through reversely-arranged spiral springs 27 similar to those indicated at 10 in connection with the first member of the instrument.

Figure 4:
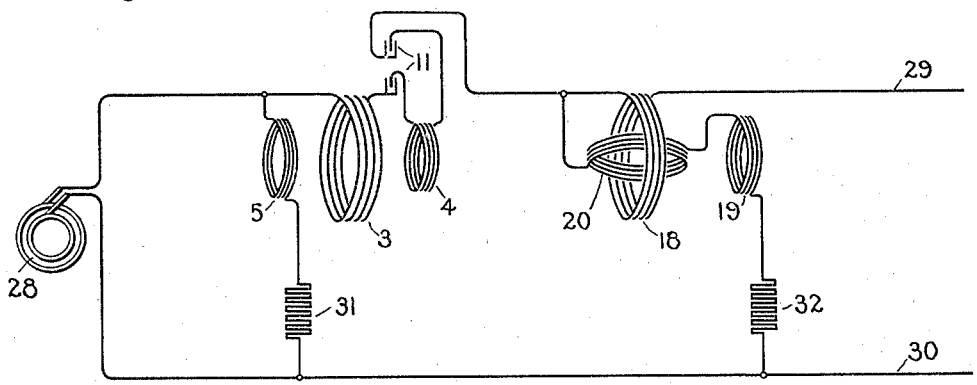

By reference to Fig. 4 the connections of the coils will be readily understood. In this figure the source of alternating current is indicated at 28, and from this source extend the supply-mains 29 and 30, by which current is conveyed to suitable current-consuming devices. (Not shown.) The current-coil 3 and the current-coil 4 are shown as in series with each other and with one of the mains, while the potential coil 5 is connected in shunt to the mains through a relatively large ohmic resistance 31, the purpose of which is not only to limit the amount of current flowing in the coil, but also to render the dephasing action of the inductance of the coil 4 negligible, whereby the current in the coil is substantially in phase with the voltage across the mains. These coils thus described constitute the operating elements of the member 1 of the indicator. Of the other member 2 the fixed current-coil is shown in Fig. 4 at 18 and, as indicated, is in series with the main 29. The fixed potential coil 19 and movable potential coil 20 are in series with each other and with a relatively large ohmic resistance 32 and are connected across the mains 29 and 30 in the same manner as the connection of the potential coil 5 of the first member of the instrument. The purpose of the resistance 32 is substantially the same as that of the resistance 31, the function of which has already been described.

In each of the members of the instrument the coils are connected or the movable element is so placed relatively to the fixed element as to produce opposing torques between one of the coils and the currents in the other two coils. Thus in Fig. 1 the current in the fixed coil 3, acting upon the movable coil 4, tends to produce a rotation of the movable coil in one direction, while the action of the current in the coil 3 upon the relatively movable potential coil 5 tends to produce rotation of the movable member in the opposite direction. The movable member then rotates in its bearings until the torques exerted upon its coils, by varying relatively to each other, finally reach a condition of equilibrium. The position which the movable member thus assumes is therefore a measure of the ratio between the two turning moments acting upon the movable member—in other words, between the watts W of the circuit and $C^2$. The watts or true energy of the circuit is represented by the torque exerted between the current-coil, and the potential coil 5 and $C^2$ by the torque exerted between the fixed current-coil 3 and the movable current-coil 4 in series therewith. In a similar manner, referring to the member 2 of the instrument, it will be evident that the fixed current-coil 18 exerts a torque upon the movable potential coil 20 and that the fixed potential coil 19 also exerts a torque upon the movable potential coil. The movable coil then turns into such a position as will cause a balance between the torques exerted upon it by the two fixed coils 18 and 19. The position thus assumed of course varies according to the relative values of the currents in the two fixed coils and is therefore a measure of the ratio between the torques exerted between these currents—in other words, of the ratio between W and $E^2$, where, as before, W indicates watts and $E^2$ the square of the voltage across the alternating-current mains.

In order to multiply together the indications produced by the two members 1 and 2 of the indicating instrument, I provide an indicating mechanism in which the indications result from movements in two dimensions, produced, respectively, by the members 1 and 2. A convenient arrangement for effecting this result I have shown in position in Fig. 1 and in disconnected views in Figs. 2 and 3. This arrangement consists of a fixed dial 33, the surface of which is spherical. This dial may be supported in any convenient manner, but in the present position is placed over the coils of the member 2 and held in place by means of lugs 34, attached to standards or otherwise secured to the base of the instrument. In Fig. 1 this spherical scale or dial is broken away so as to show the coils underneath; but in Figs. 2 and 3 it is represented complete. The members 1 and 2 of the instrument are mounted relatively to each other so that the axis of the shaft of the member 1 extended and the axis of the shaft of the member 2 intersect at the center of curvature of the spherical surface of the dial 33. The respective shafts of the members 1 and 2 carry indexes each having the form of an arc of a circle. These indexes are made as light as possible and may be constructed, for example, out of aluminium. The index carried by the shaft 6 is represented at 35 and is arranged in the form of a loop, the portion 35 of which forms the index proper, moving over the surface of the dial 33, and the other portion at 36 passing behind the dial and secured to the portion 35 at the point 37, so as to stiffen the arrangement as a whole. The loop consisting of the portion 35 and 36 is supported by the shaft 6 by the angularly-extending arms 38 and 39, which are fastened thereto. The index 40 has its working portion of circular form and is carried from arms 41 and 42, extending toward the shaft and fixed thereto, as indicated. The index 40 as it moves up and down over the dial 33 is arranged so as to just clear the index 35, which in turn moves back and forth over the dial about its axis, which in the present instance is at substantially right angles to the axis of motion of the index 40. It is not, however, essential that the axes of motion of these indexes should be at right angles to each other, provided that for geometrical reasons they intersect at the center of curvature, or approximately so, of the dial 33.

The instrument above described indicates according to the position of the intersection of its indexes over the surface of the spherical dial 33. The instrument is calibrated empirically, the graduations taking the form of a series of lines—such, for example, as 43—each line representing a given value of power factor. Thus if the intersection of the indexes occurs anywhere on a given line a given value of power factor is indicated. If the intersection occurs on any other line, the power factor is that indicated by that particular line.

What I claim as new, and desire to secure by Letters Patent of the United States, is—

1. In a measuring instrument, the combination of unconnected and independently-movable members adapted to measure quantities each different from the other, and means for combining the indications of the members so as to produce a single resulting indication.

2. The combination of two pivotally-mounted members each adapted to be deflected independently of the other by current supplied from an alternating-current circuit and arranged so that the axis of oscillation of one member is at an angle to the axis of oscillation of the other, and coöperating indicating devices for producing a single resultant indication.

3. In a measuring instrument, the combination of two independently-movable members, the axes of oscillation of the members being arranged at an angle to each other, an index for each member, and a single dial in coöperative relation to the indexes.

4. In a measuring instrument, the combination of two indicating members arranged with the axis of movement of the movable part of one at an angle to the axis of movement of the movable part of the other, and means for multiplying or combining the indications of each instrument so as to produce a resulting indication.

5. In an electric measuring instrument, the combination of two pivotally-mounted members each adapted to be deflected independently of the other by current supplied from an alternating-current circuit, and arranged relatively to each other so that the axis of oscillation of one member intersects the axis of oscillation of the other at an angle, an index carried by each member, and a dial adapted to be traversed by said indexes.

6. The combination of a dial having a spherical surface and a plurality of indexes each in the form of an arc of a circle arranged to move over the surface of the dial and pivoted so that the axis of oscillation of each passes through the center of curvature of the spherical surface of the dial.

7. In an electric measuring instrument, the combination of two independently-moving members, one of which measures the ratio between the watts of an alternating-current circuit and the square of the current in the circuit, and the other the ratio between the watts of the alternating-current circuit and the square of the voltage of said circuit, and means for combining the indications of said members.

8. In an electric measuring instrument, the combination of two movable members each provided with an index, one of which is adapted to assume a position depending upon the ratio between the watts of an alternating-current circuit and the square of the current in the circuit, and the other a position depending upon the ratio between the watts of said circuit and the square of the voltage of said circuit, and a dial over the surface of which said indexes are adapted to pass.

9. In an electric measuring instrument, the combination of two separate movable members, means for producing a deflection of one of said movable members dependent upon the ratio between the watts or true energy of an alternating-current circuit and the square of the current in said circuit, means for producing a deflection of the other movable member dependent upon the ratio between the watts or true energy of said alternating-current circuit and the square of the voltage between mains of said circuit, indexes carried by the respective movable members each in the form of an arc of a circle, and a spherical dial arranged in coöperative relation to said indexes.

In witness whereof I have hereunto set my hand this 5th day of June, 1902.

WILLIAM H. PRATT.

Witnesses:
DUGALD MCK. MCKILLOP,
JOHN A. MCMANUS.